US012583719B2

(12) United States Patent (10) Patent No.: US 12,583,719 B2
Renzi et al. (45) Date of Patent: Mar. 24, 2026

(54) ANTI-COLLISION SYSTEM

(71) Applicant: UBIQUICOM S.R.L., Milan (IT)

(72) Inventors: Davide Raffaele Renzi, Milan (IT);
Marco Gualtieri, Milan (IT); Andrea Belisario, Milan (IT)

(73) Assignee: UBIQUICOM S.R.L., Milan (IT)

( * ) Notice: Subject to any disclaimer, the term of this patent is extended or adjusted under 35 U.S.C. 154(b) by 82 days.

(21) Appl. No.: 18/689,877

(22) PCT Filed: Aug. 9, 2022

(86) PCT No.: PCT/IB2022/057400
§ 371 (c)(1),
(2) Date: Mar. 7, 2024

(87) PCT Pub. No.: WO2023/037179
PCT Pub. Date: Mar. 16, 2023

(65) Prior Publication Data
US 2024/0375925 A1     Nov. 14, 2024

(30) Foreign Application Priority Data

Sep. 7, 2021    (IT) ........................ 102021000023078

(51) Int. Cl.
*B66F 9/075*          (2006.01)
*G01S 5/16*          (2006.01)
(52) U.S. Cl.
CPC .............. *B66F 9/0755* (2013.01); *G01S 5/16* (2013.01)
(58) Field of Classification Search
None
See application file for complete search history.

(56) References Cited

U.S. PATENT DOCUMENTS

| | | | |
|---|---|---|---|
| 9,567,102 B1* | 2/2017 | Ross | G01C 21/365 |
| 2002/0175825 A1 | 11/2002 | Clerk et al. | |
| 2005/0012602 A1* | 1/2005 | Knoop | B60R 21/013 701/45 |
| 2011/0273723 A1* | 11/2011 | Haberer | F16P 3/14 348/46 |
| 2012/0025964 A1* | 2/2012 | Beggs | G08G 1/166 340/435 |
| 2013/0257607 A1 | 10/2013 | Rgby et al. | |
| 2015/0154863 A1* | 6/2015 | Fossier | G09F 13/12 340/907 |
| 2017/0337820 A1* | 11/2017 | Glatfelter | G08G 1/166 |
| 2018/0170250 A1* | 6/2018 | Hänninen | G08G 1/163 |

OTHER PUBLICATIONS

International Search Report and Written Opinion received for International Application No. PCT/IB2022/057400, mailed on Nov. 28, 2022, pp. 11.

* cited by examiner

*Primary Examiner* — Daniel L Greene
(74) *Attorney, Agent, or Firm* — Gearhart Law LLC

(57)          ABSTRACT
An anti-collision system for a storage area comprises at least one emitter device (2), at least one receiver device (3), a signaller device and a control unit. The emitter device (2) can be coupled to a forklift (C) movable within the storage area and is configured to emit an optical signal. The receiver device (3) is installable at a ceiling of the storage area and 5 is configured to monitor at least one transit zone (Z) of the storage area so as to acquire the optical signals (O) emitted therein. The control unit is configured to activate the signaller device as a function of the optical signals (O) acquired so as to generate an alert signal.

14 Claims, 5 Drawing Sheets

ANTI-COLLISION SYSTEM

TECHNICAL FIELD

The present invention relates to the technical field of safety and localization devices.

In particular, the present invention relates to an anti-collision system installable in a storage area and capable of monitoring it in order to reduce up to eliminating the risk of accidental collisions in particular between forklifts moving within the area.

PRIOR ART

It is known to use forklifts driven by an operator or self-driven to move products within a storage area defined for example by a warehouse having one or more loading/unloading stations, conveyors and shelves through which the products are received, sorted and stored.

In particular, the forklifts move along one or more movement paths that extend and intersect within the storage area.

In many stretches of such paths, especially at crossings, the risk of collisions between forklifts that come from different directions and are following respective movement paths or even between forklifts and pedestrians that are moving within the area and are transiting even for short stretches at the movement paths may be high.

Such a problem is particularly accentuated by the fact that it is not always possible to ensure optimal visibility of each single transit zone of the storage area within which the forklifts can transit.

In fact, especially the shelves on which the products are usually accumulated in the storage areas significantly reduce the visual field of those who move therein and it is therefore difficult to notice in a timely manner the presence and approach of a forklift that could be hidden from view by one or more products, by a shelf or by another structure present in the area, generating a high risk of accidental collisions.

OBJECT OF THE INVENTION

In this context, the technical task underlying the present invention is to propose an anti-collision system which obviates at least some of the drawbacks in the prior art as described above.

In particular, it is an object of the present invention to provide an anti-collision system capable of monitoring the storage area and promptly alerting those moving therein of the occurrence of a situation of potential danger due to which it is appropriate to pay particular attention in order to avoid unwanted collisions.

The technical task set and the objects specified are substantially attained by an anti-collision system, comprising the technical characteristics as set out in one or more of the accompanying claims.

According to the present invention, an anti-collision system implementable in a storage area is shown for preventing in particular the collisions of forklifts moving within the storage area itself with other forklifts and/or people.

The system essentially comprises at least one emitter device, at least one receiver device, at least one signaller device and at least one control unit.

The emitter device can be coupled to a respective forklift and can be configured to emit an optical signal.

Preferably, each emitter device is configured to generate a unique optical signal different from the optical signals generated by each further emitter device.

The receiver device is installable at a ceiling of the storage area. Furthermore, the receiver device is configured to monitor at least one transit zone of the storage area so as to acquire optical signals emitted within such a transit zone.

The transit zone can be any space within the storage area within which collisions could occur, for example stretches of the movement paths of the forklifts, in particular stretches where there are crossings with other paths or pedestrian crossings.

The signaller device can be activated to generate an alert signal.

The control unit is configured to activate the signaller device as a function of the optical signals acquired by the receiver device.

Advantageously, the system presented herein allows to monitor specific zones of the storage area in real time, activating an alert signal when necessary, with which the entry and/or presence of moving forklifts is made known also when such forklifts are not visible due to obstacles such as products, machinery, shelves or other.

The dependent claims, incorporated herein by reference, correspond to different embodiments of the invention.

BRIEF DESCRIPTION OF THE DRAWINGS

Further characteristics and advantages of the present invention will become more apparent from the indicative and thus non-limiting description of a preferred but non-exclusive embodiment of an anti-collision system, as illustrated in the attached drawings, in which.

DETAILED DESCRIPTION OF THE PREFERRED EMBODIMENTS OF THE INVENTION

Figure 1A:
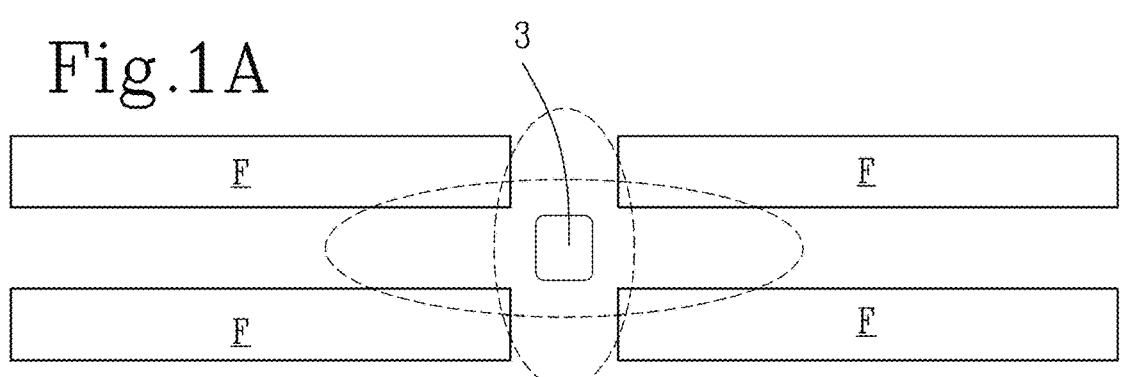
FIGS. 1A and 1B show a first possible embodiment of the anti-collision system according to the present invention.

In the attached drawings, the numerical reference 1 indicates in general an anti-collision system, identified hereinafter in the present description simply as the system 1.

In particular, the system 1 is implementable to reduce up to eliminating the risk of collisions within a storage area, for example collisions between forklifts C or collisions of forklifts C with pedestrians moving within the storage area.

The term storage area is intended to include any structure within which it is necessary to perform movement and/or storage operations of products, such as for example warehouses, sorting hubs and production plants. Structurally, the system 1 comprises at least one emitter device 2, at least one receiver device 3, a signaller device 11, 12 and a control unit 10.

The emitter device 2 is configured to be coupled to a forklift C that must move within the storage area, preferably following one or more predefined movement paths to carry the products from one point to another of the area itself.

Such an emitter device 2 is also configured to generate and emit an optical signal O, i.e., a luminous signal.

By way of example, the emitter device 2 can be or comprise one or more LED light sources configured to operate at a specific frequency.

Therefore, in general, the emitter device 2 is or comprises a light source configured to generate a luminous signal having a frequency outside the range of visible light.

Such a characteristic allows to minimise possible interference and make the optical signal O generated easily distinguishable from the artificial or natural ambient lighting present within the storage area.

Furthermore, the emitter device 2 preferably has an emission field of the respective optical signal O of an amplitude equal to or greater than 60° so as to be easily detectable.

In fact, as will be explained below, the optical signal O is acquired and identifiable by the receiver device 3 to detect the presence and transit of the forklift C within certain transit zones Z of the storage area and the wide emission field ensures the easy and safe acquisition of the optical signal by the receiver device 3.

Therefore, the implementation of even just one emitter device 2 on a single forklift C already allows to detect the presence of such a forklift C within specific parts of the storage area and possibly alert pedestrians moving in the same part that it is necessary to pay particular attention to avoid collisions.

Preferably, however, the system 1 comprises a plurality of emitter devices 2 each couplable to a respective forklift C and preferably capable of emitting a respective optical signal O different from the optical signals O which can be generated by each other emitter device 2.

It is thereby not only possible to monitor the presence of each of the forklifts C within specific parts of the storage area, but it is also possible to uniquely identify them by virtue of the unique coupling that exists between a given forklift C and the specific optical signal O generated by the emitter device 2 associated therewith.

Therefore, the acquisition of a specific optical signal O within a certain transit zone Z also allows to uniquely identify which specific forklift C is located at that point of the storage area.

It is thereby not only possible to prevent accidental collisions, but also to locate the forklifts C by identifying their position inside specific sections of the storage area, detecting the respective and unique optical signal O thereof by means of the system 1.

In more detail, each emitter device 2 can be configured to emit the respective optical signal O according to a specific unique on/off sequence which thus allows it to be distinguished from all the other emitter devices 2. In accordance with a particular aspect of the present invention, the system 1 comprises a plurality of pairs of emitter devices 2, in which each emitter device 2 of each pair can be coupled to a distinct portion of a respective forklift C.

Therefore, in this context, two emitter devices 2 are mounted in separate and distinct positions on each forklift C, preferably a first emitter device 2 is coupled in use to a front portion of the forklift C so as to project the optical signal O in front of the forklift C itself, while a second emitter device 2 is coupled in use to a rear portion of the forklift C so as to project the optical signal O behind the forklift C.

As will be clearer below, such a further characteristic allows to determine not only the presence of a forklift C in certain zones of the warehouse, but also its exact position and its movement direction with good accuracy by virtue of the acquisition of the various optical signals O generated by the receiver device 3.

In fact, the receiver device 3 is configured to acquire the optical signals O generated by the emitter devices 2 and such information can be used to determine the presence (and as anticipated above possibly also the position) of the forklifts C.

In particular, the receiver device 3 can for example comprise one or more photodiodes through which the optical signals O are acquired.

Operatively, the receiver device 3 is installable at a ceiling of the storage area and is configured to monitor at least one transit zone Z of such a storage area so as to specifically acquire the optical signals O generated therein.

The term transit zone Z is intended to include any zone of the storage area within which one or more forklifts C and/or pedestrians can transit, thus for example specific stretches of the movement paths of the forklifts C and/or crossings between several distinct paths and/or zones at pedestrian crossings.

Operatively, in use, the receiver device 3 is thus applied to the ceiling of the storage area and has a viewing angle of 360° about a vertical axis X and comprised in a range of −90° to +90° with respect to such a vertical axis X.

That is, the receiver device 3 monitors the entire transit zone Z surrounding the position in which it is installed and, as can be seen in the accompanying figures, the amplitude of the viewing angle with respect to the vertical axis X effectively determines the amplitude of the transit zone Z that the receiver device 3 is capable of monitoring.

Preferably, the system 1 comprises a plurality of receiver devices 3 each of which is installable in a respective portion of the storage area so as to be able to monitor distinct transit zones.

In particular, as anticipated above, each receiver device 3 is configured to monitor a respective transit zone Z defining a stretch of a single movement path of the forklifts inside the storage area (which can for example be a stretch at which a pedestrian crossing is found) or a crossing between two or more movement paths.

In use, therefore, the receiver device 3 acquires the optical signals O emitted by the emitter devices 2 coupled to the forklifts C that are transiting within the monitored transit zone Z.

The acquisition of the optical signals O by the receiver device 3 is then used by the control unit to activate the signaller device 11, 12.

That is, whenever the receiver device 3 acquires an optical signal O, the presence of a forklift C within the transit zone Z is recognised and the control unit activates the signaller device 11, 12.

In detail, the signaller device 11, 12 can be activated to generate an alert signal by means of which it is possible to alert those who are in the transit zone Z of the presence of the forklift C that caused the signaller device 11, 12 to be activated.

Therefore, overall, the system 1 monitors one or more transit zones of the storage area and when a forklift C enters therein it generates an alert signal that warns any additional people present or close to such zones of the presence of the forklift C.

It is thereby possible to make the presence of the forklift C in the vicinity of the transit zone Z known, even if the forklift C itself is hidden from view by a shelf or by a stack of products or by another element that hinders the view.

By virtue of this timely warning, those moving in the transit zone Z can pay particular attention and the collision risks between forklifts C and pedestrians are avoided.

Preferably, the control unit 10 is configured to process not only the acquisition of the optical signal O, but also other parameters such as its intensity, so as to also determine the distance of the emitter device 2 (thus of the forklift C to which the latter is coupled) and preferably its advancement speed.

In fact, the greater the light intensity of the signal acquired by the receiver device 3 and the smaller the distance between the emitter device 2 and the receiver device 3, moreover, the variation rate of the measured intensity can be used to calculate the advancement speed of the forklift C. Furthermore, by using the information collected by several different receiver devices 3 it is also possible to determine where the forklift C is located and how it is moving (in which direction and with what speed), operatively determining the sequence with which the various receiver devices 3 acquire the optical signal O of the same emitter device 2 and what time interval elapses between the successive acquisitions of two different receiver devices 3.

In accordance with an aspect of the present invention, the signaller device 11, 12 comprises an acoustic signaller 11 (e.g., a speaker) and the warning signal comprises an acoustic signal A (e.g., a siren).

Alternatively or additionally, the signaller device 11, 12 comprises an optical signaller 12 and the alert signal comprises a luminous signal L.

In particular, the signaller device 12 can comprise an LED-type light source, a laser or a lamp capable of generating the luminous signal. Preferably, the luminous signal L is generated according to a colour code adapted to identify a risk level of a potential collision, such a risk level is determined as a function of the optical signals O acquired by the receiver device 3.

That is, the control unit receives the optical signals O acquired by the receiver device 3 and, as a function of its information content, determines a risk level and consequently activates an adequate alert signal.

Figure 5A:
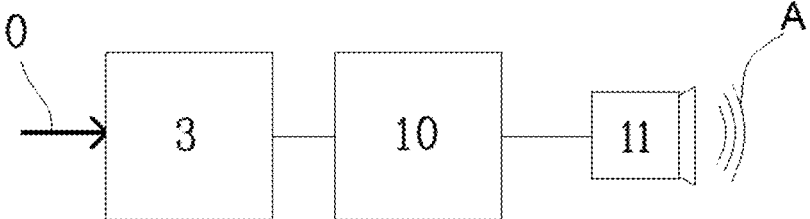
FIGS. 5A-5C show different embodiments for some of the components of the system
Figure 5B:
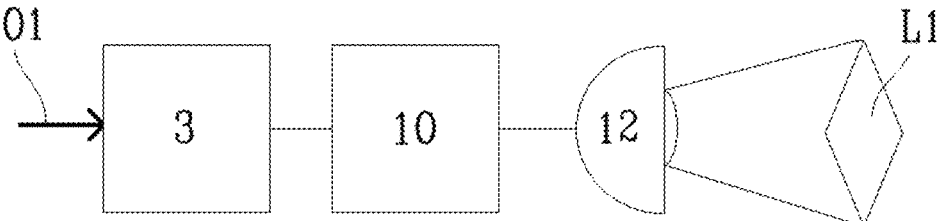
Figure 5C:
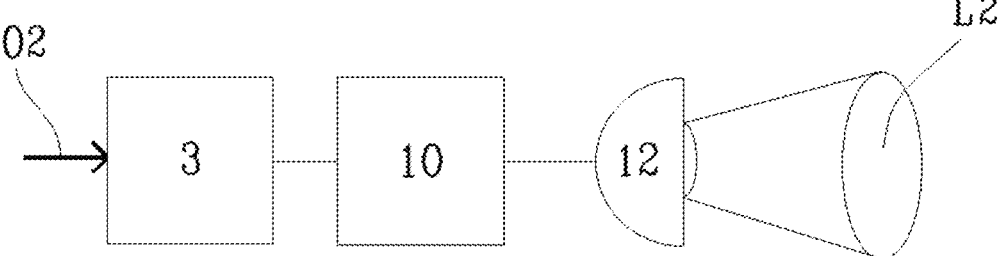

As depicted in FIGS. 5B and 5C, for example, in a first situation presenting a first risk level the receiver device 3 may receive a first optical signal O1 which causes the control unit 10 to control the optical signaller 12 to generate a first luminous signal L1, in a second situation presenting a second risk level the receiver device 3 may receive a second optical signal O2 which causes the control unit 10 to control the optical signaller 12 to generate a second luminous signal L2.

It is noted that in the attached figures the signals L1 and L2 are represented with different shapes for ease of representation, but it is to be understood that as indicated above the first and second luminous signals L1 and L2 may also have be characterized by different colours.

By way of example, the risk level can be calculated/determined as a function of the number of forklifts C present in the transit zone (thus the number of optical signals O acquired), of the position of the forklifts C and/or of their movement speed (thus as a function of the intensity of the optical signals O or as a function of how the receiver device 3 or the receiver devices acquire the optical signal O).

The above also applies if the alert signal comprises an acoustic signal A. In fact, the acoustic signal A can also be generated with different parameters, such as frequency and/or volume and/or tones, as a function of the risk level of a potential hazardous situation in which collisions could occur.

Alternatively or additionally, the system 1 comprises an optical signaller 12 made by means of a projector configured to project graphical signs at least onto a floor of the storage area at the transit zone Z.

In particular, the graphical signs can comprise textual or numerical information that allows to indicate the position, the advancement direction, the advancement speed of the forklift C that caused the generation of the alert signal or other useful information that allows to reduce the risk of collisions.

Preferably, the system 1 comprises a plurality of signaller devices 11, 12 coupled to respective receiver devices 3.

That is, each signaller device 3 is uniquely coupled to a respective signaller device 11, 12, so as to ensure the independence and autonomy of the detection and of the generation of the alert signals in the various transit zones that are monitored by the system 1.

Similarly, the system 1 can also comprise a plurality of control units 10 each uniquely associated and coupled to the respective receiver devices 3 and/or signaller devices 11, 12.

That is, the system 1 can comprise a plurality of nodes each of which comprises a receiver device 3, a signaller device 11, 12 and a control unit 10, for example enclosed within the same box-like body.

Each of such nodes can be positioned to monitor a respective and distinct transit zone Z of the storage area and the various nodes can be interfaced with each other, for example, by means of a wired type connection or by means of wireless communication protocols of a known type (for example, by means of Wi-Fi® or Bluetooth® protocols) for the collection and sharing of information.

Alternatively, the system 1 can comprise a single control unit 10 connected according to one of the methods indicated above with all the receiver devices 3 or a central unit 10 connected to the individual control units 10 of the various nodes and configured to acquire all the information collected, thus allowing centralised management, storage and analysis. Referring to the embodiment schematically shown in the attached FIGS. 1A and 1B, a receiver device 3 can be seen positioned so as to monitor a transit zone Z defining a crossing delimited by shelves S or in any case by bulky structural elements of the storage area that reduce visibility.

The receiver device 3 is capable with its field of view of continuously monitoring all the aisles that meet centrally at the crossing at which it is positioned.

Figure 1B:
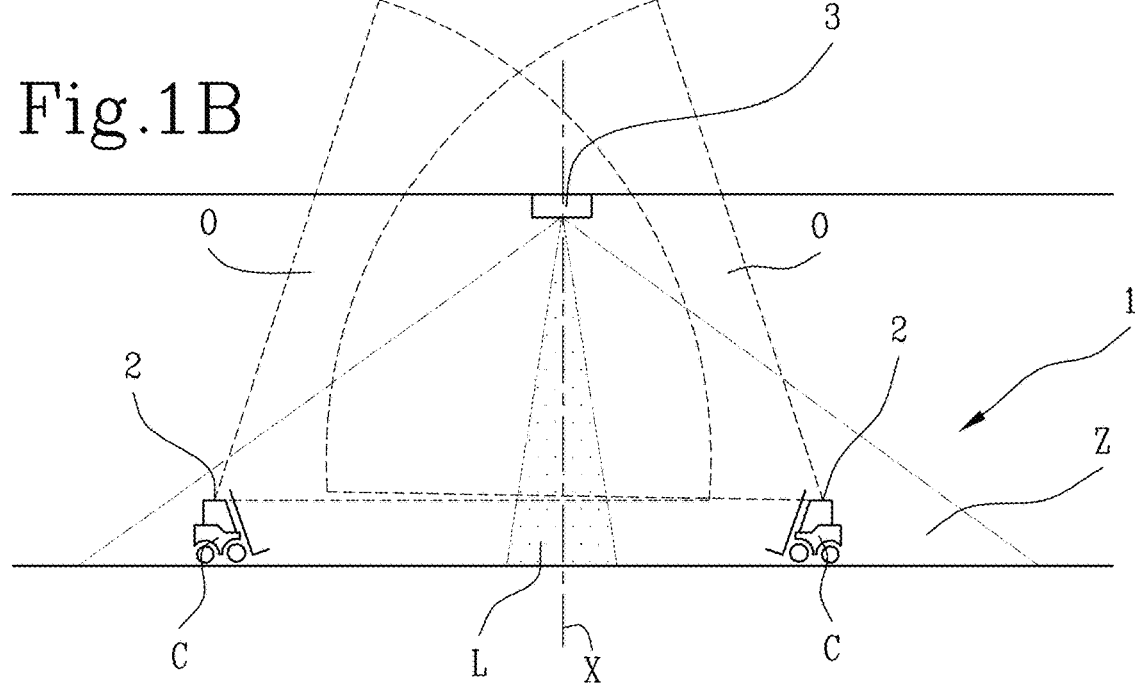

FIG. 1B shows two forklifts that enter within the transit zone Z monitored by the receiver device 3 and in fact the optical signals O generated by the emitter devices 2 coupled thereto hit the receiver device 3 and this causes the generation of the alert signal.

Such an alert signal is illustrated in FIG. 1B in the form of a luminous signal L or luminous beam L which is projected at the centre of the crossing below the receiver device 3, so as to be easily visible regardless of the direction from which a further forklift C or a pedestrian is approaching the crossing.

At the same time as the generation of the luminous beam L, the signaller device 11, 12 can also emit an acoustic signal to make the approach of the forklift still easily identifiable.

In this context, those who are heading towards the crossing from different directions from those of the forklifts C that cause the generation of the alert signal cannot see them due to the encumbrance presented by the shelves S, but are still alerted of their presence by the luminous beam L, thus eliminating the risk of accidental collisions.

In accordance with a further possible embodiment, each receiver device 3 comprises a plurality of sensors, each of which is configured to acquire optical signals O from a respective portion of the transit zone Z.

In this context, it is possible to even more precisely determine not only the presence but also the specific position of the forklifts C entering the transit zone Z and advantageously the control unit 10 is configured to activate the signaller device as a function of the sensor or sensors that acquire the optical signals O.

That is, the alert signal is generated as a function not only of the acquisition of the optical signal O, but also as a function of which specific sensor has detected it and/or of the order in which the sensors that are part of the receiver device 3 acquire the optical signal O.

Figure 2:
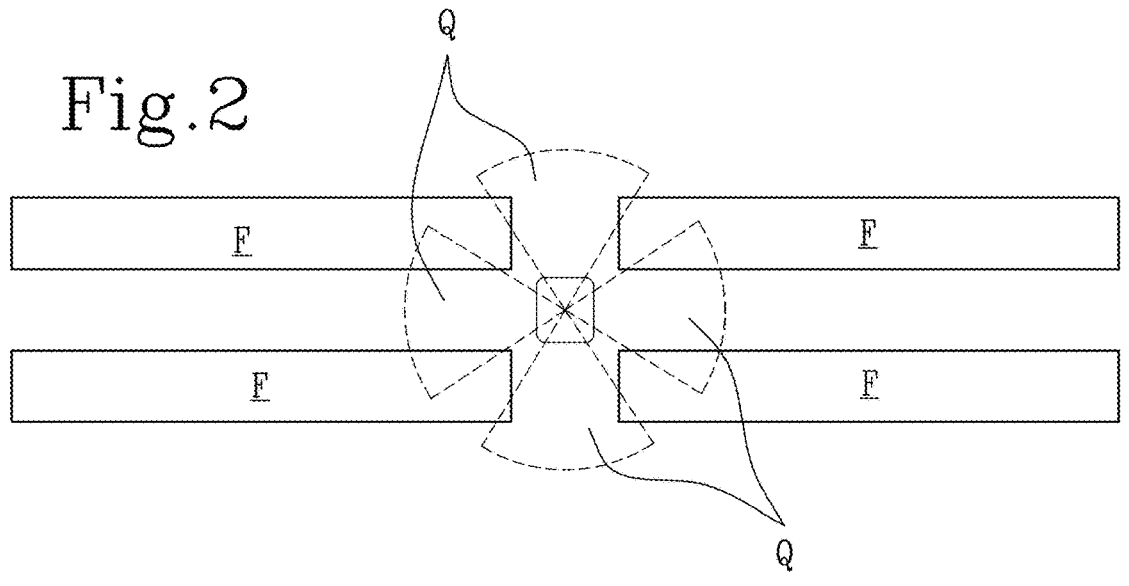
FIGS. 2, 3A-3B and 4A-4B show respective further possible embodiments that also add the localization functionality to the system.

In accordance with a possible embodiment, shown in FIG. 2, the receiver device 3 comprises four sensors, each of which is configured to acquire, in use, the optical signals O coming from a respective quadrant Q of the transit zone Z.

For example, each sensor can be arranged to monitor a different aisle that converges at the central crossing at which the receiver device 3 is installed.

In general, therefore, the receiver device 3 can comprise a number of sensors adapted and sufficient to independently monitor each of the aisles that extend from the position in which the receiver device 3 itself is installed.

In the specific situation illustrated in FIG. 2, each sensor therefore acquires the optical signals O from a respective aisle that extends from the central crossing and therefore as a function of which specific sensor acquires the optical signal O, the control unit 10 determines in which aisle the forklift C is located.

In this context, the alert signal can be generated so as to indicate not only the potential danger deriving from the presence of the forklift C but also in which aisle it is located and therefore from which direction it is approaching the crossing.

The analysis of the order with which the individual sensors acquire the optical signal O also allows to determine both the position and the movement direction followed by the forklift C and then locate it within the storage area.

In fact, the activation of a certain sensor allows to determine that the forklift C is inside the quadrant Q monitored by it.

Figure 3A:
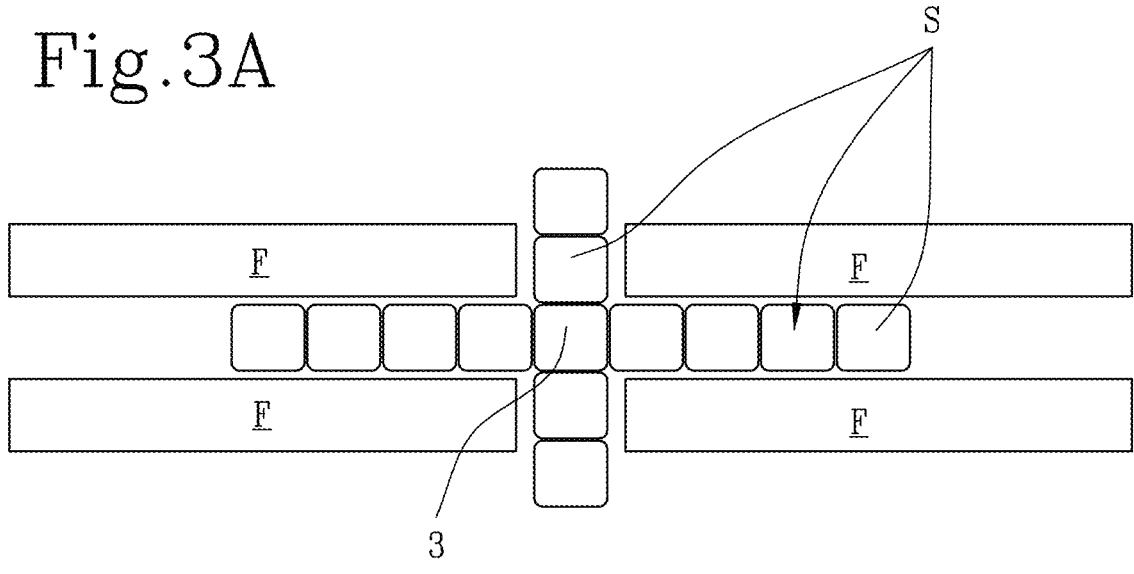
Figure 3B:
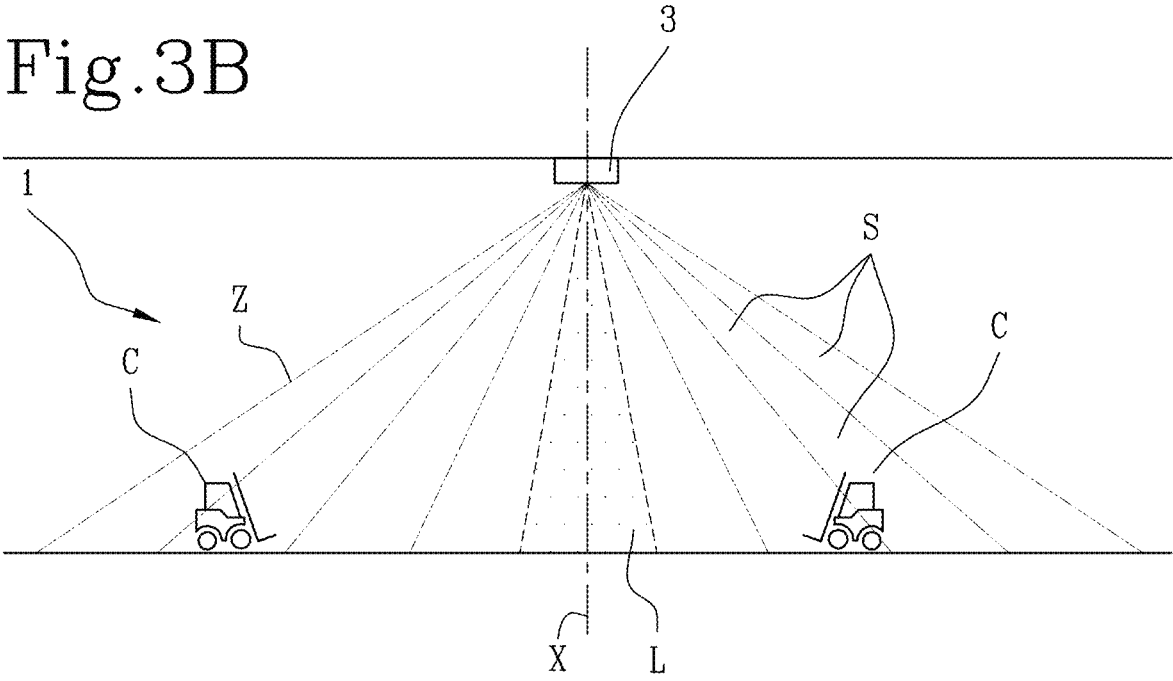

In accordance with a further possible embodiment, schematically shown in FIGS. 3A and 3B, the receiver device comprises a plurality of sensors each of which acquires optical signals O from a respective section of the transit zone Z.

In this context, the sensors can be made by photodiodes or comprise photodiodes having respective viewing angles that are a fraction of the overall viewing angle of the receiver device 3, for example comprised between 10° and 20°.

The photodiodes are arranged so that the respective viewing angles are consecutive, thereby monitoring the entire transit zone Z overall and the total viewing angle of the receiver device 3 is thus given by the sum of all the viewing angles of the individual sensors.

As can be seen in FIG. 3A, the transit zone Z is thus divided into a plurality of distinct sectors S that extend starting from the vertical axis X and each of which is uniquely associated with a specific sensor and therefore, as shown instead in FIG. 3B, when a forklift C enters each of these sectors S the corresponding sensor acquires the optical signal O generated by the emitter device 2 coupled to the forklift C and it is thus possible to identify the presence and the position of the forklift C.

In such a context, it is possible to implement emitter devices 2 having lower emission angles (for example between 10° and) 20° so as to make the reading of the optical signals O by the sensors more precise.

Furthermore, the sequence with which the sensors acquire the optical signal O and the time intervals between the acquisition of the optical signal O by adjacent sensors allows the control unit 10 to determine not only the presence, but also the exact position together with the direction and the movement speed of the forklift C.

Figure 6:
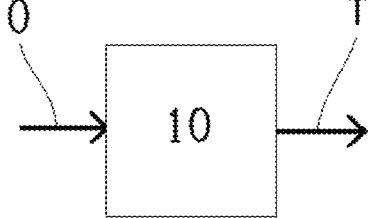
FIG. 6 shows a detail of a possible feature of a component of the system

In other words, as depicted in FIG. 6, the control unit 10 may receive as an input the optical signal O and provide an output signal T determining and identifying a position and/or an advancement speed of at least one forklift C.

In fact, in a manner similar to what is indicated above for the quadrants Q, the activation of a certain sensor indicates the presence of the forklift C inside the sector S monitored by it.

Figure 4A:
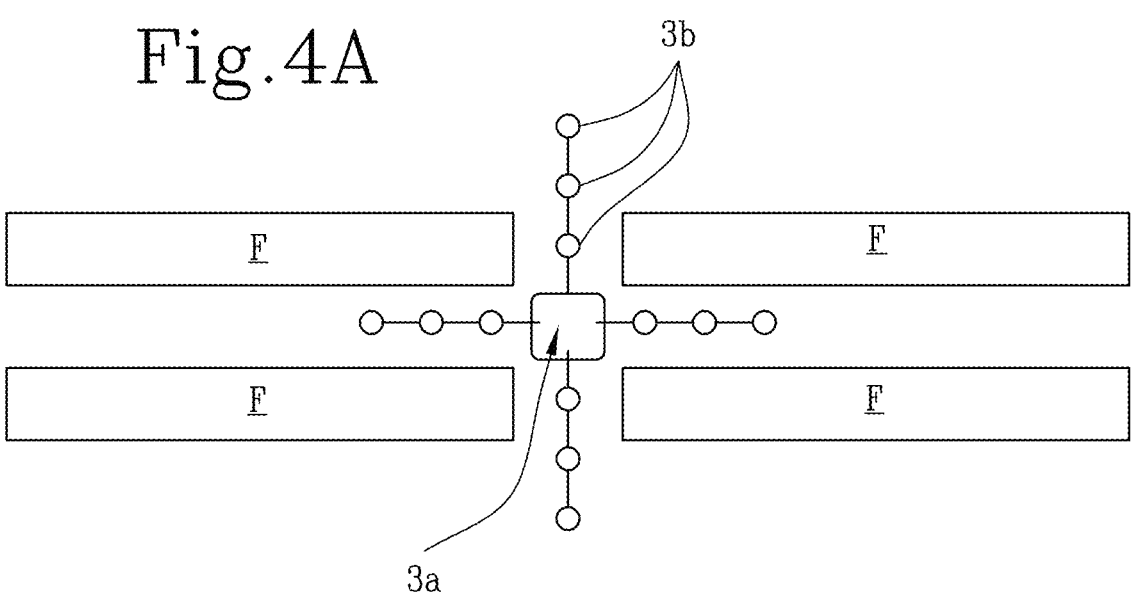

In accordance with a further possible embodiment, shown in FIGS. 4A and 4B, the receiver device 3 comprises a main sensor 3a configured to acquire optical signals O from a central portion P of the transit zone Z below such a main sensor 3a and a plurality of auxiliary sensors 3b arranged away from said main sensor 3a and configured to acquire optical signals O from respective radially peripheral portions P of the transit zone Z which are below the auxiliary sensors 3b.

Also in this context, the transit zone Z is operatively divided into a plurality of distinct sections in which each section is monitored by a distinct sensor (the main sensor 3a or one of the secondary sensors 3b) thus allowing to identify also in this case not only the presence of one or more forklifts C and of the potential risk of collision, but also their specific position within the section of the storage area that is being monitored.

In general, each section in which the transit zone Z can be divided (whether it is a quadrant Q, a sector S or a portion P) can be associated with one of the aforementioned risk levels and therefore the identification of the presence of the forklift C therein, and possibly also of the further possible parameters identified above, can cause the generation of an alert signal that takes the risk level into account.

Figure 4B:
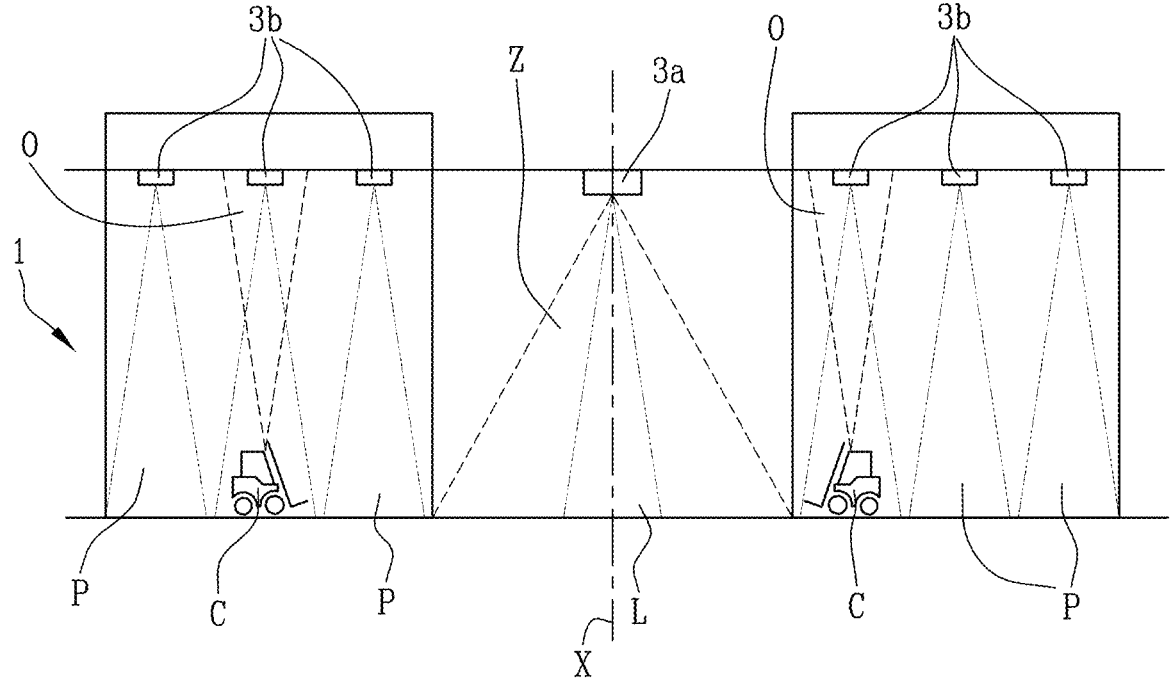

Advantageously, if as in the situation illustrated in FIG. 4B, there is more than one forklift C in the transit zone Z and the forklifts C in transit are associated with different risk levels, the alert signal is generated as a function of the higher risk level among those identified.

Furthermore, a system 1 can be installed inside the storage area which comprises a plurality of receiver devices 3 made according to distinct methods and embodiments different from those listed and described above, so as to allow the installation in the various transit zones Z of the storage area of the specific receiver device 3 which is more suitable and performing in that specific situation.

A complete coverage of the various transit zones Z of the storage area advantageously allows not only to reduce up to avoiding the risk of accidental collisions, but also to precisely and accurately monitor the position of the individual forklifts C within the storage area.

Advantageously, the present invention achieves the proposed objects, overcoming the drawbacks complained of in the prior art, providing the user with an anti-collision system 1 capable of making known in an efficient, timely and complete manner the presence of a forklift C within one or more transit zones Z of the storage area, thus allowing them to be located and to avoid the risk of collisions.

The invention claimed is:

1. An anti-collision system for a storage area, said system comprising:
    a plurality of emitter devices which can be associated with a respective plurality of forklifts, wherein each emitter device is configured to generate a respective different optical signal from the optical signals which can be generated by each other emitter device;

at least one receiver device installable at a ceiling of the storage area and configured to monitor at least one transit zone of the storage area so as to acquire optical signals emitted inside said transit zone;

a signaller device which can be activated to generate an alert signal;

a control unit configured to activate the signaller device as a function of the optical signals acquired by the receiver device.

2. The system according to claim 1, comprising a plurality of pairs of emitter devices, each emitter device of each pair being able to be coupled to a distinct portion of a respective forklift.

3. The system according to claim 1, wherein during use the receiver device has a viewing angle comprised in a range from −90° to +90° with respect to a vertical axis and of 360 degrees about said vertical axis.

4. System according to claim 1, wherein the signaller device comprises an acoustic signaller and the alert signal comprises an acoustic signal.

5. The system according to claim 1, wherein the control unit is configured to determine a position of at least one forklift in the transit zone and/or to calculate an advancement speed of at least one forklift as a function of the optical signals acquired by the receiver device.

6. The system according to claim 1, wherein each receiver device comprises a plurality of sensors, each sensor being configured to acquire optical signals from a respective portion of said transit zone, said control unit being configured to activate the signaller device also as a function of the sensor or of the sensors that acquire the optical signals.

7. The system according to claim 6, wherein the receiver device comprises four sensors, each sensor being configured to acquire optical signals from a respective quadrant of said transit zone.

8. The system according to claim 6, wherein the receiver device comprises a plurality of sensors configured to acquire optical signals from respective adjacent sectors of the transit zone, the sum of the viewing angles of the sensors being equal to the viewing angle of the receiver device with respect to a vertical axis.

9. The system according to claim 6, wherein the receiver device comprises a main sensor configured to acquire optical signals from a central portion of the transit zone below the main sensor and a plurality of auxiliary sensors arranged away from said main sensor and configured to acquire optical signals from respective radially peripheral portions of the transit zone below said auxiliary sensors.

10. The system according to claim 1, comprising a plurality of receiver devices which can be installed in respective transit zones of the storage area.

11. The system according to claim 10, wherein each receiver device is configured to monitor a respective transit zone defining a stretch of a single movement path of the forklifts inside the storage area or a crossing between two or more movement paths.

12. The system according to claim 1, wherein the signaller device comprises an optical signaller and the alert signal comprises a luminous signal.

13. The system according to claim 12, wherein the luminous signal is generated according to a colour code adapted to identify a risk level, said control unit being configured to determine said risk level as a function of the optical signals acquired by the receiver device.

14. The system according to claim 12, wherein the optical signaller comprises a projector configured to project graphical signs onto a floor of the storage area at the transit zone.

* * * * *